Patented June 16, 1936

2,044,220

UNITED STATES PATENT OFFICE 2,044,220

FILMING AND COATING COMPOSITION

Harold A. Levey, New Orleans, La.

No Drawing. Application July 27, 1931,
Serial No. 553,477

13 Claims. (Cl. 106—40)

The present invention relates to films of cellulose derivatives, either self sustaining or employed as protective coatings and to compositions for producing the same. It will be fully understood from the following description, wherein various embodiments of the invention are specifically set forth.

Films of the various cellulose plastic compositions, such as viscose, cellulose acetate, cellulose nitrates, cellulose ethers and the like, as hitherto made, are not inherently moisture-transmission resistant. Thus, I have found that a viscose film of approximately 0.001 inch thickness transmits approximately 60 grams of water per 100 square inches of exposed surface per 24 hours at 70° F., with a relative humidity of 100% on one side and 50% on the other side of the film. Similarly, a film of pure cellulose acetate of the same thickness and under the same conditions transmits, for the same area, from 40 grams to 55 grams of water per 24 hours, depending upon the viscosity of the cellulose acetate employed, higher viscosity products showing the lower moisture transmission. The moisture transmission of the cellulose acetate film may be somewhat reduced, say by about 20% by the incorporation of plasticizers of a water-insoluble, non-hygroscopic type; and the moisture transmission may likewise be reduced by a similar or slightly larger amount by incorporating into the film of the plastic natural and synthetic resins. In general, however, the films or coatings produced from such cellulose plastic compositions are not satisfactory as protective agents for food products, tobacco and the like. Efforts have hitherto been made to further improve the resistance of the film to moisture transmission, by the use of composite films for example, but these are in general unsatisfactory or expensive. It has been particularly difficult hitherto to secure films consisting mainly of the organic derivatives of cellulose having low moisture transmission properties, the effort hitherto made involving the use of composite films, one constituent of which includes a highly inflammable nitro-cellulose compound of relatively great wax solvent power.

I have discovered that the resistance to moisture transmission of cellulose plastic films of the type normally transmitting moisture readily (that is, having a moisture transmissibility of 25 to 30 grams or more per 100 square inches per 24 hours under the conditions hereinbefore set forth) may be markedly increased by incorporating into the film varying proportions of wax-like bodies such as the natural vegetable and animal waxes and the higher fatty acids. The organic derivatives of cellulose have not hitherto been regarded as available for use with such waxes by reason of the low solubility compatibility or miscibility of waxes therewith. For example, various wax-like bodies, such as bayberry, spermaceti, and various higher fatty acids such as palmitic acid, stearic acid, lauric acid, myristic acid and the like may be employed. I have found that the incorporation into the film or the surface thereof of small proportions of such wax-like bodies, say in general less than 5% and ordinarily from 0.5 to 2% reduces the moisture transmission through the film to 10 to 15% or less of that which it would normally have. Thus, by operating in accordance with the present invention, I have been able to produce films which, in a thickness of 0.001 inch, show a moisture transmission of 2 to 5 grams per 100 square inches per 24 hours under the conditions of the test hereinbefore described.

In general, I prefer to employ the wax-like body in the production of a homogeneous film with the cellulose ester material, suitably in conjunction with plasticizers and with natural or synthetic resinous materials preferably non-hygroscopic in character; or the use of separate plasticizers may be eliminated, for example, by employing synthetic resinous materials having a plasticizing action. For example, I may employ resinous bodies of the soluble, fusible, phenolaldehyde or urea-aldehyde types compatible with cellulose acetate or other cellulose derivative employed and particularly those incorporating fatty compounds or fatty acids or acetylated derivative thereof, such as are now employed as resinous bodies and plasticizers in cellulose lacquers, cellulose plastics and the like, for example, the commercial product known as Bakelite resin plasticizer XR-926.

In preparing a composition produced in accordance with the present invention, the cellulose ester body, with a suitable proportion of the wax-ester body, as hereinbefore set forth, together like material, as hereinbefore set forth, together with suitable plasticizers or resinous bodies or both are incorporated into a suitable solvent or solvent mixture. While the ordinary solvents may be employed, such as ethylene glycol methyl ether, the acetic ester of the mono-ethyl ether of ethylene glycol, acetone, or the like, or mixtures thereof with higher boiling solvents. It is preferred that the use of very low boiling solvents alone be avoided, as in their evaporation they tend to produce a greater porosity of the film than is desired. I found as particularly suitable, that I may employ acetone or mixtures of acetone with higher boiling solvents such as diacetone-alcohol, glycol monomethyl ether, ethyl lactate, acetic ester of ethylene glycol monoethyl ether or the like. With the solvents, varying proportions of solvent mixtures, such as methanol and benzol, may be incorporated.

The usual proportions of ordinary plasticizers such as ethyl phthalate, triphenyl phosphate, paratoluene sulphonamide or the like may be employed, or such plasticizers may be omitted entirely. In general it is preferred to employ a resinous body of the natural or synthetic type in proportions ranging from 5 to 35% on the total solids and preferably from 15 to 25%. The ordinary resins such as glyceryl-phthalate resins or the like may be used. However, I prefer to employ a permanently soluble, fusible resin of the phenol aldehyde or phenol-methylene type, suitably one incorporating in its composition a fatty body, and compatible with the cellulose derivative, such compounds having plasticizing properties. However, plasticizers or resinous bodies or both may be omitted, since I have found that the moisture transmission resistance of the film deposited from a simple solution of a cellulose ester may be greatly increased by incorporating therewith wax-like bodies in the proportions hereinbefore described.

A preferred composition in accordance with the present invention is one containing the following constituents (exclusive of solvents):

|  | Per cent |
|---|---|
| Cellulose acetate | 80 |
| Bayberry wax | 1 |
| Soluble phenol-aldehyde resinoid | 19 |

The above ingredients may be dissolved in 6 to 7 times their weight of a suitable solvent or mixture of solvents, such as acetone or a mixture of acetone and diacetone alcohol containing 4 to 5% by weight of the latter.

A second specific formula prepared in accordance with the present invention is as follows:

|  | Per cent |
|---|---|
| Cellulose acetate | 80 |
| Palmitic acid | 2 |
| Soluble phenol-aldehyde resinoid | 18 |

These constituents may be dissolved in solvent constituents such as are described in connection with the preceding example. These compositions, when deposited to form films 0.001 inch thick, have a moisture transmission value under the conditions hereinbefore set forth of less than 2 grams of water per 100 square inches per 24 hours. The resulting films are transparent, and as will be seen from the above data, have a moisture transmission value of the order of one twenty-fifth of that of cellulose ester films as hitherto produced.

In the above examples, other resinous bodies, such as a urea-aldehyde resinoid or a compatible natural resin may be substituted for the phenol-aldehyde resinoid or the resinoid may be omitted, and a non-hygroscopic plasticizer, such as triphenyl phosphate, employed.

In place of cellulose acetate other organic derivatives of cellulose, such as the ethers, amino compounds, and other carboxylates, such as the formates, propionates, benzoates, stearates, and of mixtures thereof may be employed, suitable solvents being employed. Small proportions of inorganic esters, as the nitrates, may be admixed with the organic cellulose derivatives, but the proportion employed should not exceed about 15% of the cellulose derivatives.

The compositions of the present invention may be formed into self sustaining films in the usual manner, by depositing them, for example, on a continuously traveling metal band, gelatin coated surface or the like, evaporation of the solvent, and removal from the band, or they may be applied as coatings of the desired thickness, for example, on articles to be protected from access or transmission of moisture and including formed sheets or articles of various cellulose derivatives, gelatin, casein, albumen, starch or starch derivatives, viscose and the like. It is particularly applicable to films of such protein and carbohydrate materials to produce composite films or sheets of high moisture transmission resistance and may be applied to one or both sides thereof. Dyes, pigments and the like may be incorporated therewith, as desired.

If desired, films produced in accordance with the present invention may have their porosity, such as may result from evaporation of solvents, reduced, for example, by a calendering or burnishing operation; for example, they may be passed between metallic rolls, one of which travels at a more rapid rate than the other, thereby burnishing and compacting the film. Such calendering or burnishing is effective with cellulose derivative films in general in securing a reduced moisture transmission therethrough.

The moisture transmission of cellulose plastic films, as hitherto prepared and as ordinarily available, as well as of fibrous or more or less absorptive films or sheets in general, may likewise be greatly reduced by the application or incorporation in the surface thereof of minute proportions of wax-like bodies of the character hereinbefore described. In order to effect such surface application of the wax-like body, the latter, which may be stearic acid, palmitic acid or the like or mixtures thereof is dissolved or suspended in a volatile organic solvent, or vehicle, suitably to form a solution or suspension containing one-half to 2%, and preferably about 1% of the wax-like bodies. A cellulose acetate film or sheet is passed through such a solution, preferably while the latter is maintained moderately warm, say at a temperature of 40 to 70° C. and preferably 50 to 60° C., the temperature being substantially below the boiling point of the solvent used. The sheeting is removed from the solution, the solvent is then evaporated, and the treated sheet is heated, for example, by passing it through an oven heated to a temperature slightly higher than the melting point of the wax-like body employed; for example, to a temperature of 60 to 65° C. in the case of a paraffin wax of 135° F. melt point; to a similar temperature in the case of beeswax; or to a temperature of 85 to 95° C. in the case of carnauba wax. In the heating operation, the wax on the surface of the sheet is fused to a continuous deposit, which may be further improved, for example, by passing through cloth or felt wipers or buffing rolls. Wax may be similarly applied to sheets or films of cellulose derivatives, paper sheets, bakelite sheets and other more or less absorptive materials.

The solvent for the wax employed in the surface treating operation may be one in which the cellulose derivative is substantially insoluble, such as naphtha, carbon tetrachloride or the like, in which case the applied wax is but very little incorporated into the body of the sheet. It is preferred, however, that the solvent or solvent mixture employed for the wax be one having a weak solvent action on the cellulose acetate or other cellulose plastic constituting the sheet; for example, a solvent mixture containing 50% of acetone, 25% of diacetone alcohol and 25% of carbon tetrachloride. With such a solvent, it is preferred to employ a wax-like body having a slight miscibility with cellulose acetate in the solid state, such as bayberry wax or palmitic acid, the wax content of the solution being about the same as hereinbefore set forth. The solution is used at a suitable temperature, say 40° C. With such solutions, the surface of the cellulose acetate or other cellulose plastic sheets or films is slightly attacked and the wax-like compound is intimately incorporated with the surface material of the sheet. The application of such solutions may be followed by a heating and wiping treatment as hereinbefore described, if desired.

The present invention may be employed in connection with the preparation of films, sheets and the like from various cellulose plastics having a high moisture transmission rate such as the cellulose acetates, formates, butyrates, propionates and benzoates, and the cellulose methyl and ethyl ethers, the amino compounds and other cellulose derivatives. The films prepared in accordance with the present invention, when self sustaining, may be employed as wrappings for food products, tobacco products, pharmaceuticals and the like or in general where high moisture transmission resistance is desired, and when in the form of coating films are valuable where resistance to passage of moisture is needed, such as a coating composition and film for sheets of viscose, gelatin, casein, starch, etc. The films and coatings prepared in accordance with the present invention are particularly valuable as electrical insulating materials or for the protection of electrical insulating materials, since they have of themselves excellent dielectric qualities.

I claim:

1. A transparent film-forming base comprising approximately 80% cellulose acetate, 18 to 19% soluble phenol aldehyde resin, and the balance a compound of the class consisting of bayberry wax and palmitic acid.

2. A film-forming composition comprising a base comprising approximately 80% cellulose acetate, 1% palmitic acid, 19% soluble phenol aldehyde resin, and a solvent for said base.

3. A film-forming composition comprising a base comprising approximately 80% cellulose acetate, 2% palmitic acid and 18% soluble phenol aldehyde resin, and a solvent for the base.

4. As an article of commerce, a transparent film-forming composition comprising a major portion of an organic derivative of cellulose, a minor portion of a soluble phenol aldehyde resin, and a compound of the class consisting of bayberry wax and palmitic acid, said compound being present in the amount of ½ to 2% by weight of the weight of the cellulose derivative and the phenol aldehyde resin; and a solvent therefor.

5. The film-forming composition as set forth in claim 4, in which the cellulose derivative is cellulose acetate.

6. The film-forming composition as set forth in claim 4, in which the compound is bayberry wax.

7. The film-forming composition as set forth in claim 4, in which the compound is palmitic acid.

8. A transparent homogenous self-sustaining flexible film, comprising approximately 80 parts cellulose acetate, 19 parts of a soluble phenol aldehyde resin and 1 part bayberry wax.

9. A transparent homogenous self-sustaining flexible film, comprising approximately 80 parts cellulose acetate, 2 parts palmitic acid and 18 parts soluble phenol aldehyde resin.

10. A homogenous transparent self-sustaining flexible film, comprising approximately 80% cellulose acetate, 18 to 19% soluble phenol aldehyde resin and the balance a compound of the class consisting of bayberry wax and palmitic acid.

11. A homogenous transparent self-sustaining flexible film comprising a major proportion of cellulose acetate, a minor proportion of a soluble phenol aldehyde resin and ½ to 2% of the weight of the combined resin and acetate of a compound of the class consisting of palmitic acid and bayberry wax.

12. A film as in claim 11 in which the compound is palmitic acid.

13. A film as in claim 11 in which the compound is bayberry wax.

HAROLD A. LEVEY.